United States Patent
Zhang et al.

(10) Patent No.: US 12,159,436 B2
(45) Date of Patent: Dec. 3, 2024

(54) TRANSFORM METHOD, INVERSE TRANSFORM METHOD, ENCODER, DECODER AND STORAGE MEDIUM

(71) Applicant: GUANGDONG OPPO MOBILE TELECOMMUNICATIONS CORP., LTD., Guangdong (CN)

(72) Inventors: Wei Zhang, Guangdong (CN); Fuzheng Yang, Guangdong (CN); Shuai Wan, Guangdong (CN); Yanzhuo Ma, Guangdong (CN); Junyan Huo, Guangdong (CN); Na Dai, Guangdong (CN); Zexing Sun, Guangdong (CN); Lihui Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 438 days.

(21) Appl. No.: 17/655,409

(22) Filed: Mar. 18, 2022

(65) Prior Publication Data
US 2022/0207781 A1    Jun. 30, 2022

Related U.S. Application Data

(63) Continuation of application No. PCT/CN2019/109646, filed on Sep. 30, 2019.

(51) Int. Cl.
*G06T 9/00* (2006.01)
*G06F 5/01* (2006.01)

(52) U.S. Cl.
CPC .............. *G06T 9/001* (2013.01); *G06F 5/01* (2013.01)

(58) Field of Classification Search
None
See application file for complete search history.

(56) References Cited

U.S. PATENT DOCUMENTS

2019/0228050 A1    7/2019   Chou et al.

FOREIGN PATENT DOCUMENTS

| CN | 103136535 A | 6/2013 |
|----|-------------|--------|
| CN | 108171761 A | 6/2018 |

(Continued)

OTHER PUBLICATIONS

E. Pavez and P. A. Chou, "Dynamic polygon cloud compression," 2017 IEEE International Conference on Acoustics, Speech and Signal Processing (ICASSP), New Orleans, LA, USA, 2017, pp. 2936-2940, doi: 10.1109/ICASSP.2017.7952694 (Year: 2017).*

(Continued)

*Primary Examiner* — Vu Le
*Assistant Examiner* — Charles C L Penny
(74) *Attorney, Agent, or Firm* — PERKINS COIE LLP

(57) ABSTRACT

Provided in the embodiments of the present application are a transform method, inverse transform method, encoder, decoder and storage medium. The method comprises: determining a two-dimensional Morton code of an encoding point in a preset space of an encoding point cloud, wherein the two-dimensional Morton code is a Morton code corresponding to two-dimensional coordinates of the encoding point obtained by removing one of three-dimensional coordinates of the encoding point; performing right shift of the two-dimensional Morton code by K binary digits to determine point sets respectively corresponding to three-dimensional coordinate components; determining, from the point sets, point quantities of maximum included encoding points respectively corresponding to the three-dimensional coordinate components; determining, based on the point quantities, (Continued)

a transform order corresponding to the preset space; performing RAHT based on the transform order; and signaling the transform order and an attribute encoding result obtained after RAHT into a bitstream.

19 Claims, 8 Drawing Sheets

(56) References Cited

FOREIGN PATENT DOCUMENTS

| | | | |
|---|---|---|---|
| CN | 108833927 | A | 11/2018 |
| CN | 109196559 | A | 1/2019 |
| CN | 108632621 | B | 7/2019 |
| EP | 3979638 | A1 | 4/2022 |
| EP | 3993424 | A1 | 5/2022 |
| WO | 2019147816 | A1 | 8/2019 |

OTHER PUBLICATIONS

M. Krivokuća, P. A. Chou and M. Koroteev, "A Volumetric Approach to Point Cloud Compression—Part II: Geometry Compression," in arXiv preprint Image and Video Processing, 2018, arXiv:1810.00484. (Year: 2018).*

Extended European Search Report for European Application No. 19947959.3 issued Dec. 12, 2022. 12 pages.

Mammou, K. et al. "G-PCC codec description v1" ISO/IEC JTC1/SC29/WG11 N18015; Oct. 2018; Macau, China. 31 pages.

Zhang, W. et al. "[G-PCC][new proposal] The effect of RAHT transform order on the attribute coding performance" ISO/IEC JTC1/SC29/WG11 MPEG2019/m49126; Jul. 2019; Gothenburg, CH. 5 pages.

Zhang, W. et al. "[G-PCC][new proposal] The effect of RAHT transform order on the attribute coding performance" ISO/IEC JTC1/SC29/WG11 MPEG2019/m49126; Jul. 2019; Gothenburg, SE. 5 pages.

Gustavo, Sandri et al. "Point Cloud Compression Incorporating Region of Interest Coding" 2019 IEEE International Conference on Image Processing, Aug. 26, 2019 (Aug. 26, 2019) (5 pages).

International Search Report issued Jun. 23, 2020 of PCT/CN2019/109646 (6 pages).

Zhang, Qi et al. "Point Clouds Attribute Compression Using Data-Adaptive Intra prediction" 2018 IEEE Visual Communications and Image Processing, Apr. 25, 2019 (Apr. 25, 2019) (4 pages).

Chou, P.A., et al., Transform Coder for Point Cloud Attributes—Compression of 3D Point Clouds Using a Region-Adaptive Hierarchical Transform—IEEE Transactions on Image Processing—ISO/IEC JTC1/SC29/WG11 MPEG2016/m38674 May 2016, Geneva, Switzerland (10 pages).

* cited by examiner

| x: | 0<br>000 | 1<br>001 | 2<br>010 | 3<br>011 | 4<br>100 | 5<br>101 | 6<br>110 | 7<br>111 |
|---|---|---|---|---|---|---|---|---|
| y: 0<br>000 | 000000 | 000001 | 000100 | 000101 | 010000 | 010001 | 010100 | 010101 |
| 1<br>001 | 000010 | 000011 | 000110 | 000111 | 010010 | 010011 | 010110 | 010111 |
| 2<br>010 | 001000 | 001001 | 001100 | 001101 | 011000 | 011001 | 011100 | 011101 |
| 3<br>011 | 001010 | 001011 | 001110 | 001111 | 011010 | 011011 | 011110 | 011111 |
| 4<br>100 | 100000 | 100001 | 100100 | 100101 | 110000 | 110001 | 110100 | 110101 |
| 5<br>101 | 100010 | 100011 | 100110 | 100111 | 110010 | 110011 | 110110 | 110111 |
| 6<br>110 | 101000 | 101001 | 101100 | 101101 | 111000 | 111001 | 111100 | 111101 |
| 7<br>111 | 101010 | 101011 | 101110 | 101111 | 111010 | 111011 | 111110 | 111111 |

FIG. 3

TRANSFORM METHOD, INVERSE TRANSFORM METHOD, ENCODER, DECODER AND STORAGE MEDIUM

CROSS-REFERENCE TO RELATED APPLICATION

The present application is a continuation application of International PCT Application No. PCT/CN2019/109646, filed on Sep. 30, 2019, the entire content of which is hereby incorporated by reference.

TECHNICAL FIELD

Embodiments of the present application relate to the field of video encoding and decoding technology, in particular to a transform method, an inverse transform method, an encoder, a decoder, and a storage medium.

BACKGROUND

In an encoder framework of Geometry-based Point Cloud Compression (G-PCC), geometric information of a point in a point cloud and attribute information corresponding to the point are encoded separately. After geometric encoding is completed, the geometric information is reconstructed, and encoding of the attribute information will depend on the reconstructed geometric information.

At present, attribute information encoding is mainly for encoding of color information. Firstly, color information is transformed from an RGB color space to a YUV color space. Then, reconstructed geometric information is used for recoloring a point cloud, so that attribute information that is not encoded corresponds to the reconstructed geometric information. In color information encoding, there are mainly two transform modes, one is distance-based enhanced transform which depends on Level of Detail (LOD) partitioning, and the other is Region Adaptive Hierarchical Transform (RAHT) which is directly performed. According to any one of the two modes, color information is converted from a spatial domain to a frequency domain, high-frequency and low-frequency coefficients are obtained through conversion, and finally the coefficients are quantized and encoded to generate a binary bitstream. Herein, the RAHT is performed on a basis of a hierarchical structure obtained through octree partitioning performed on point cloud data, and starting from a lowest level of an octree up to a highest level, traverses every node in each layer. An RAHT performed on each node is performed sequentially with a transform order in z, y, and x directions of three-dimensional coordinates.

However, since different point clouds have different spatial distributions, when an RAHT is performed, transform coefficients obtained by using a fixed transform order still have large information redundancy, resulting in poor encoding and decoding efficiency.

SUMMARY

An embodiment of the present application provides a transform method, an inverse transform method, an encoder, a decoder, and a storage medium, which can reduce redundancy of transform coefficients obtained by transform and improve encoding and decoding efficiency.

Technical solutions of the embodiments of the present application may be implemented as follows.

In a first aspect, an embodiment of the present application provides a transform method, which is applied to an encoder, the method includes: determining a two-dimensional Morton code of an encoding point in a preset space of an encoding point cloud, wherein the two-dimensional Morton code of the encoding point is a Morton code corresponding to two-dimensional coordinates obtained by sequentially removing one of three-dimensional coordinate components of the encoding point; performing right shift of the two-dimensional Morton code by K binary digits to determine point sets respectively corresponding to three-dimensional coordinate components, wherein K is a positive integer greater than 1; determining, from the point sets, point quantities of maximum included encoding points respectively corresponding to the three-dimensional coordinate components; determining, based on the point quantities respectively corresponding to the three-dimensional coordinate components, a transform order corresponding to the preset space; performing Region Adaptive Hierarchical Transform (RAHT) based on the transform order corresponding to the preset space; and signaling the transform order and an attribute encoding result obtained after the RAHT is performed into an attribute bitstream.

In a second aspect, an embodiment of the present application further provides an inverse transform method, including: parsing an attribute bitstream to obtain a transform order; and performing inverse Region Adaptive Hierarchical Transform (RAHT) based on the transform order.

In a third aspect, an embodiment of the present application provides an encoder, including: a determining part configured to determine a two-dimensional Morton code of an encoding point in a preset space of an encoding point cloud; wherein the two-dimensional Morton code of the encoding point is a Morton code corresponding to two-dimensional coordinates obtained by sequentially removing one of three-dimensional coordinate components of the encoding point; an acquisition part configured to perform right shift of the two-dimensional Morton code by K binary digits to determine point sets respectively corresponding to three-dimensional coordinate components; wherein K is a positive integer greater than 1; wherein the determining part is further configured to determine, from the point sets, point quantities of maximum included encoding points respectively corresponding to the three-dimensional coordinate components; and determine, based on the point quantities respectively corresponding to the three-dimensional coordinate components, a transform order corresponding to the preset space; a transforming part configured to perform Region Adaptive Hierarchical Transform (RAHT) based on the transform order corresponding to the preset space; and a signaling part configured to signal the transform order and an attribute encoding result obtained after the RAHT is performed into an attribute bitstream.

In a fourth aspect, an embodiment of the present application provides a decoder, including: a parsing part configured to parse an attribute bitstream to obtain a transform order; and a decoding part configured to perform inverse Region Adaptive Hierarchical Transform (RAHT) based on the transform order.

In a fifth aspect, an embodiment of the present application further provides an encoder, including: a first memory configured to store executable instructions; and a first processor configured to implement the transform method according to the first aspect when executing the executable instructions stored in the first memory.

In a sixth aspect, an embodiment of the present application further provides a decoder, including: a second memory configured to store executable instructions; and a second processor configured to implement the inverse transform method according to the second aspect when executing the executable instructions stored in the second memory.

In a seventh aspect, an embodiment of the present application provides a computer-readable storage medium applied to an encoder, wherein the computer-readable storage medium includes executable instructions stored thereon, and the transform method according to the first aspect is implemented when the executable instructions are executed by a first processor.

In an eighth aspect, an embodiment of the present application provides a computer-readable storage medium applied to a decoder, wherein the computer-readable storage medium includes executable instructions stored thereon, and the inverse transform method according to the second aspect is implemented when the executable instructions are executed by a second processor.

Provided in the embodiments of the present application are a transform method, an inverse transform method, an encoder, a decoder and a storage medium. The method includes: determining a two-dimensional Morton code of an encoding point in a preset space of an encoding point cloud, performing right shift of the two-dimensional Morton code by K binary digits to determine point sets respectively corresponding to three-dimensional coordinate components, wherein K is a positive integer greater than 1; determining, from the point sets, point quantities of maximum included encoding points respectively corresponding to the three-dimensional coordinate components; determining, based on the point quantities respectively corresponding to the three-dimensional coordinate components, a transform order corresponding to the preset space; performing Region Adaptive Hierarchical Transform (RAHT) based on the transform order corresponding to the preset space; and signaling the transform order and an attribute encoding result obtained after the RAHT is performed into an attribute bitstream. With the above technical implementation solution, since the encoder counts the point quantities corresponding to each coordinate component of the three-dimensional coordinate components through the two-dimensional Morton code of the encoding point in the preset space for the realization of RAHT in a process of attribute encoding, the transform order of RAHT is finally determined based on the point quantities corresponding to the three-dimensional coordinate components. In this way, considering the point quantities corresponding to the three-dimensional coordinate components, transform in a direction with a significant feature is prioritized, thus achieving purposes of reducing redundancy of transform coefficients obtained through transform and improving encoding and decoding efficiency.

BRIEF DESCRIPTION OF DRAWINGS

FIG. 3 is a first schematic diagram of an exemplary two-dimensional Morton encoding according to an embodiment of the present application.

DETAILED DESCRIPTION

In order to understand features and technical contents of embodiments of the present application in more detail, implementations of the embodiments of the present application will be described in detail below in combination with the accompanying drawings, which are for reference only and are not intended to limit the embodiments of the present application.

In an embodiment of the present application, in an encoder framework of G-PCC for a point cloud, a point cloud of an input three-dimensional picture model is partitioned into slices, and then each slice is independently encoded.

Figure 1:
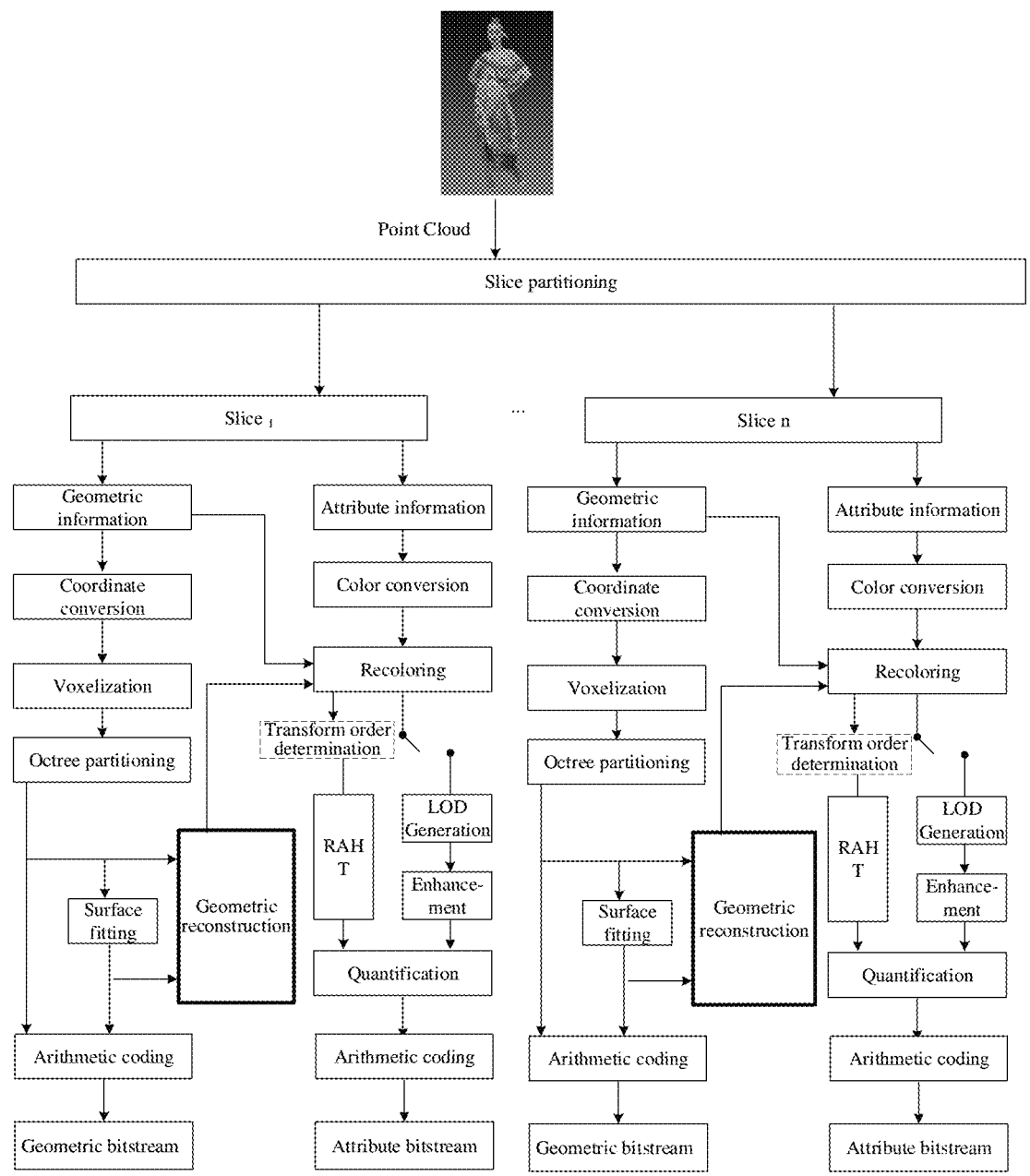
FIG. 1 is a block diagram of an exemplary encoding process according to an embodiment of the present application.

In a block diagram of a G-PCC encoding process as shown in FIG. 1, the process is applied in a point cloud encoder, for encoding point cloud data, the point cloud data is partitioned into multiple slices through slice partitioning. In each slice, geometric information of the point cloud and attribute information corresponding to each point cloud are encoded separately. In a process of geometry encoding, coordinate conversion is performed on geometric information, so that the whole point cloud is contained in a bounding box, and then quantization is performed on the point cloud. The quantization in this act mainly plays a role of scaling. Because of quantization rounding, geometric information of a part of the point cloud is the same, thus a process of determining whether to remove repeated points based on a parameter. Quantization and removal of repeated points is also called a voxelization process. Next, octree partitioning is performed on the bounding box. In a process of geometric information encoding based on an octree, the bounding box is partitioned equally into eight sub-cubes, and a non-empty sub-cube (including points in a point cloud) are continued to be partitioned into eight equal parts, until leaf nodes obtained through partitioning are 1×1×1 unit cubes, then points in the leaf nodes are arithmetically encoded to generate a binary geometric bitstream, namely a geometric bitstream. In a process of geometric information encoding based on a triangle soup (trisoup), octree partitioning will also be performed first, but unlike the geometric information encoding based on the octree, for the trisoup, a point cloud does not need to be partitioned step by step into unit cubes with a side length of 1×1×1, but partitioning is stopped when the point cloud is partitioned into blocks (sub-blocks) with a side length of W. Based on a surface formed by distribution of the point cloud in each block, at most twelve vertexes (intersection points) produced by the surface and twelve edges of the block are obtained, and the vertexes are arithmetically encoded (surface fitting based on intersection points) to generate a binary geometric bitstream, namely a geometric bitstream. Vertexes are also used for achieving a process of geometry reconstruction, and reconstructed set information is used when an attribute of the point cloud is encoded.

In a process of attribute encoding, geometry encoding has completed, and after geometric information is reconstructed, color conversion is performed, and color information (i.e. attribute information) is converted from a RGB color space to a YUV color space. Then, reconstructed geometric information is used for recoloring the point cloud, so that attribute information that is not encoded corresponds to the reconstructed geometric information. In a process of color information encoding, there are mainly two transform modes, one is distance-based enhanced transform which depends on Level of Detail (LOD) partitioning, and the other is a Region Adaptive Hierarchal Transform (RAHT) which is directly performed. In any one of the two modes, color information is converted from a spatial domain to a frequency domain to obtain a high-frequency coefficient and a low-frequency coefficient through conversion, and finally the coefficients are quantized (i.e., quantized coefficients). Finally, geometry encoding data after octree partitioning and surface fitting, and attribute encoding data processed through quantized coefficients, are subjected to slice synthesis, and then vertex coordinates of each block are encoded in turn (i.e., arithmetic encoding) to generate a binary attribute bitstream, i.e., an attribute bitstream.

Figure 2:
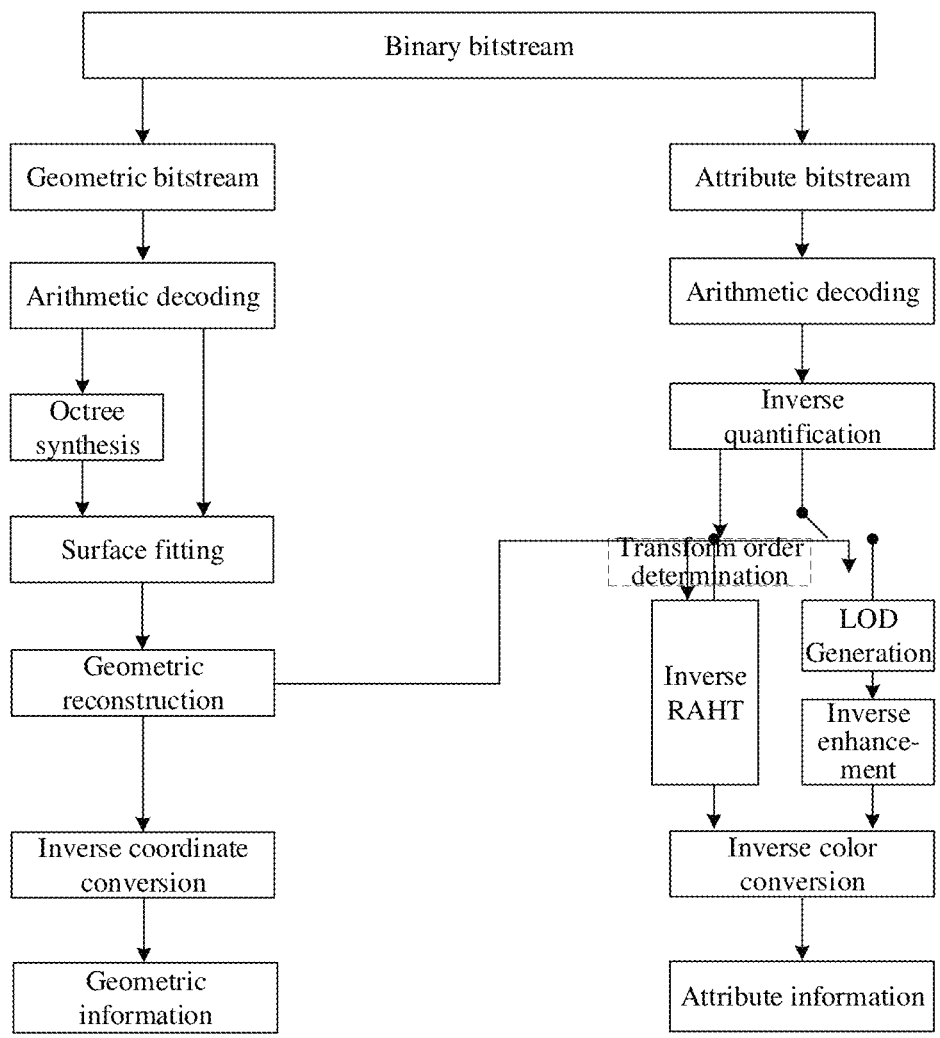
FIG. 2 is a block diagram of an exemplary decoding process according to an embodiment of the present application.

In a block diagram of a G-PCC decoding process as shown in FIG. 2, the process is applied in a point cloud decoder. The decoder acquires a binary bitstream, and independently decodes a geometric bitstream and an attribute bitstream in the binary bitstream. When the geometric bitstream is decoded, geometric information of a point cloud is obtained through arithmetic decoding-octree synthesis-surface fitting-geometry reconstruction-inverse coordinate transform. When the attribute bitstream is decoded, attribute information of the point cloud is obtained through arithmetic decoding-inverse quantization-LOD-based inverse enhancement or RAHT-based inverse transform-inverse color conversion, and a three-dimensional picture model of encoding point cloud data is restored based on the geometric information and the attribute information.

In an encoding process of attribute, RAHT is performed after a point cloud is recolored, at this time, geometric coordinate information of the point cloud may be obtained. A Morton code corresponding to each point in the point cloud may be obtained by using coordinate information of the point. Morton code is also called z-order code for its encoding order follows a spatial z-order. A specific approach of calculating a Morton code is described as follows: for a three-dimensional coordinate of which each component is represented by a d-bit binary number, its three components are represented as follows:

$$x = \sum_{\ell=1}^{d} 2^{d-\ell} x_\ell, \quad y = \sum_{\ell=1}^{d} 2^{d-\ell} y_\ell, \quad z = \sum_{\ell=1}^{d} 2^{d-\ell} z_\ell.$$

Herein $x_\ell, y_\ell, z_\ell \in \{0,1\}$ are binary values corresponding to the most significant binary digit ($\ell=1$) to the least significant binary digit ($\ell=d$) of x, y, and z respectively. For x, y, z, the Morton code M is to sequentially and alternatively arrange $x_\ell, y_\ell, z_\ell$. from the most significant binary digit to the least significant binary digit. A calculation formula of M is as follows.

$$M = \sum_{\ell=1}^{d} 2^{3(d-\ell)}(4x_\ell + 2y_\ell + z_\ell) = \sum_{\ell'=1}^{3d} 2^{3d-\ell'} m_{\ell'} \qquad (1)$$

Herein $m_{\ell'} \in \{0,1\}$ are values from the most significant binary digit ($\ell'=1$) to the least significant binary digit ($\ell'=3d$) of M. After acquiring a Morton code M of each point in a point cloud, points in the point cloud are arranged in an order of Morton code from small to large, and a weight w of each point is set as 1. If expressed in computer language, it is similar to a combination of z|(y<<1)|(x<<2).

Figure 4:
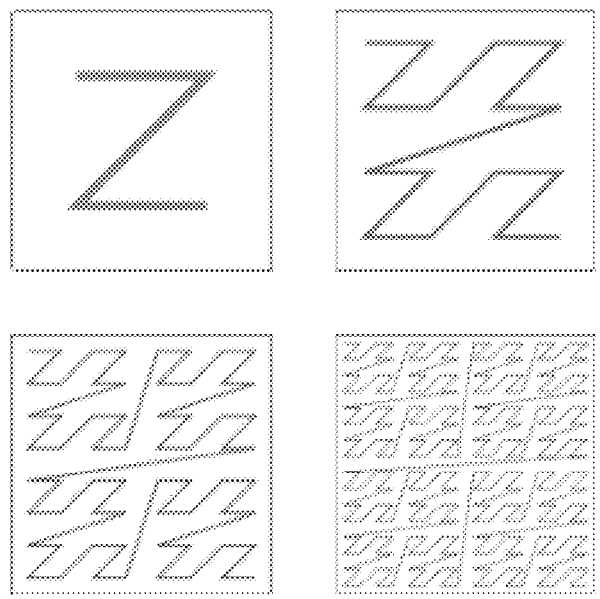
FIG. 4 is a second schematic diagram of an exemplary two-dimensional Morton encoding according to an embodiment of the present application.

With reference to FIGS. 3 and 4, description is make by taking an order from high to low here being z, y and x (x|(y<<1)|(z<<2)) as an example.

FIG. 3 shows spatial encoding of each pixel in an 8*8 picture, from 000000 to 111111, one-dimensional binary numbers are used for encoding coordinates of x and y values at positions from 0 to 7. Binary coordinate values are interleaved to obtain a binary z-value diagram. The z shapes are connected along a numerical direction to generate a recursive z-shape curve. A z value is placed at each position in the figure according to a connection order. Actually, the above figure is generated iteratively in the z direction, from 00-11 (one z in a whole figure), from 0000-1111 (one z is put at each point of a previous z), and from 0000000-111111 (one z is put at each point of a previous z), two bits are added each time, and recursion rises.

Illustratively, as shown in FIG. 4, spatial encoding orders of 2×2, 4×4, 8×8, and 16×16 are shown, from which it may be seen that an encoding order of Morton codes is realized according to a spatial z-order.

Figure 5:
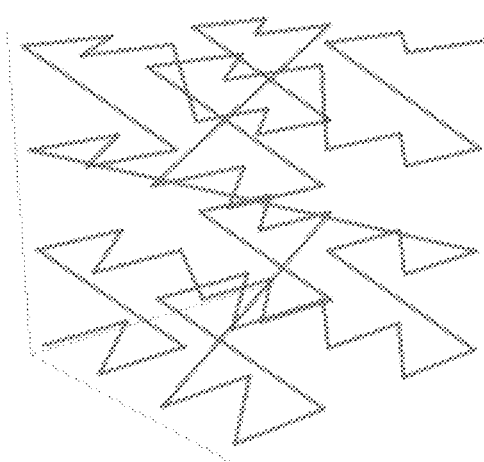
FIG. 5 is a first schematic diagram of an exemplary three-dimensional Morton encoding according to an embodiment of the present application.
Figure 6:
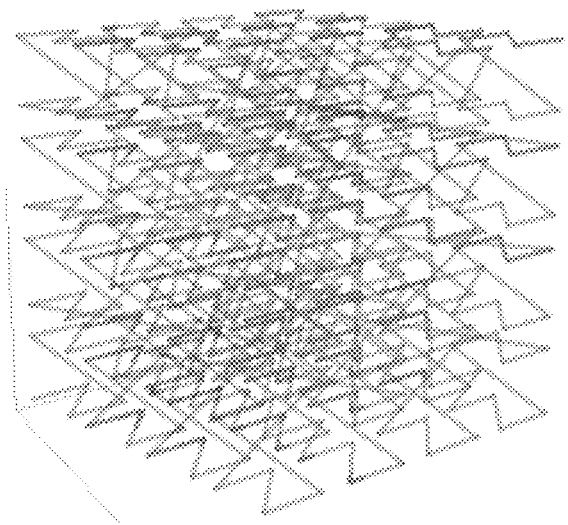
FIG. 6 is a second schematic diagram of an exemplary three-dimensional Morton encoding according to an embodiment of the present application.

When rising to 3 dimensions, a recursive process is shown in FIG. 5 and FIG. 6, which realizes coordinate interleaving, and what is done in whole is to disperse coordinate values continuously. x|(y<<1)|(z<<2); that is, each coordinate value is dispersed, and they are interleaved in turn, first z, then y, and finally x. A decoding process is an aggregation process.

Figure 7:
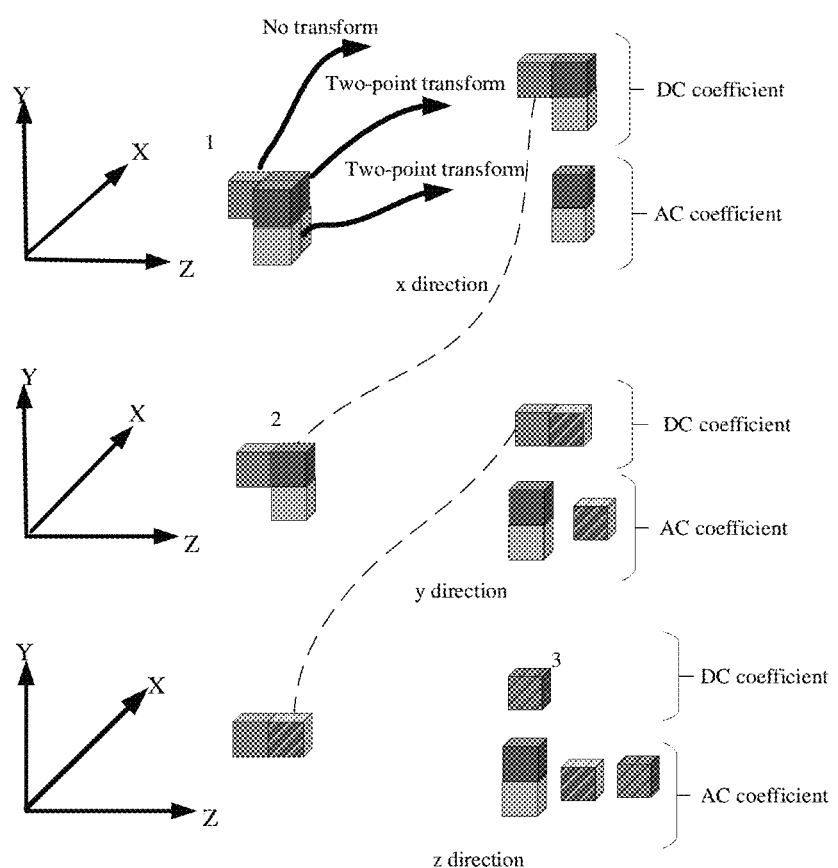
FIG. 7 is a schematic diagram of an exemplary hierarchical RAHT according to an embodiment of the present application.

RAHT is performed on a basis of a hierarchical structure obtained through octree partitioning performed on point cloud data, and starting from a bottom layer of the octree the transform is performed hierarchically. As shown in FIG. 7, a voxel block 1 is obtained after octree partitioning is completed (i.e. a geometry with three color depths in FIG. 7, and each block represents a point in the point cloud). RAHT is performed from a lowest layer. Taking a transform order xyz as an example, the RAHT is performed along an x direction as shown in FIG. 7. If there are adjacent voxel blocks in the x direction, RAHT is performed on the two voxel blocks to obtain average (a DC coefficient) and detail (an AC coefficient) of attribute values of the two adjacent points. Herein, the obtained DC coefficient is used as attribute information of a voxel block 2 of a parent node, and RAHT on a next layer is performed, while the AC coefficient is reserved for final encoding. If there is no adjacent point, an attribute value of the voxel block is directly transferred to a parent node of a second layer. RAHT on the second layer is performed along a y direction. If there are adjacent voxel blocks in the y direction, RAHT is performed on the two voxel blocks to obtain average (a DC coefficient) and detail (an AC coefficient) of attribute values of two adjacent points. After that, RAHT on a third layer is performed along a z direction, and a voxel block 3 of a parent node with three-color depth-interleaved is obtained as a child node of a next layer in an octree, and then RAHT is circularly performed along the z, y, and x directions until there is only one parent node in the whole point cloud.

In practice, when the points in the point cloud are traversed, the Morton code of the ordered point cloud is used, that is, whether two child nodes are under a parent node can be judged by whether the values of the Morton codes shifted right by one binary digit are equal.

For attribute values $c_1, c_2$ of two adjacent points, a specific RAHT process is as follows.

$$RAHT(w_1, w_2) = \frac{1}{\sqrt{w_1 + w_2}} \begin{bmatrix} \sqrt{w_1} & \sqrt{w_2} \\ -\sqrt{w_2} & \sqrt{w_1} \end{bmatrix} \quad (2)$$

$$\begin{bmatrix} DC \\ AC \end{bmatrix} = RAHT(w_1, w_2) \begin{bmatrix} c_1 \\ c_2 \end{bmatrix} \quad (3)$$

Where w is a weight corresponding to a DC coefficient, which is obtained through calculation. The DC coefficient is a weighted average value of attributes, and an AC coefficient is an attribute residual of two adjacent points.

In an embodiment of the present application, specific acts of RAHT are as follows.

(1) Attribute values of points in a point cloud are taken as DC coefficients of a first layer, and weights of their DC coefficients are set as 1, and RAHT is started.

(2) The DC coefficients and AC coefficients of this layer are filled into a parent layer of a next layer and parent nodes according to corresponding indexes. If a DC coefficient and a AC coefficient need to be filled in, the AC coefficient may not be filled when there is no AC coefficient.

(3) DC coefficients corresponding to the indexes are traversed according to the indexes sorted through Morton codes.

(4) Right shift of Morton codes corresponding to all DC coefficients is performed by one digit, at this time a Morton code of each DC coefficient represents a Morton code of its parent node.

(5) It is determined whether Morton codes of two DC coefficients are the same, if they are the same, it is indicated that RAHT is performed on the two DC coefficients under a same parent node, an obtained DC coefficient is filled in a position of a DC coefficient of a parent node of a next layer, an AC coefficient is filled in a position of a last DC coefficient of the next layer, and a weight of a sum of the two DC coefficients is assigned to the DC coefficient of the parent node; if they are different, the DC coefficient and its weight will be directly filled into the next layer.

(6) Acts (2)-(5) are repeated until there is only one DC coefficient on a certain layer.

(7) Attribute values of the DC coefficient and AC coefficient of this layer are encoded.

When RAHT is performed on the attribute values by in pairwise, the three color components of attribute information (which may be expressed by Y, U and V respectively) are calculated by RAHT respectively, and the three color components are independent of each other and apply no impact on each other.

In this way, first, according to the finally obtained DC coefficient, it is taken as a parent node, and the child nodes may be up-sampled to obtain predicted attribute values of the child nodes. The specific process is as follows:

$$a_{upsample} = \sum_{i=1}^{k} d_i^{-1} \cdot a_i / \sum_{i=1}^{k} d_i^{-1} \quad (4)$$

Where $d_i$ represents a distance between a center point of an adjacent parent node i and a center point of a child node, and $a_i$ represents an attribute value of the parent node.

Then, the child nodes with the predicted attribute values are taken as the parent nodes of the next layer, and the child nodes of the next layer are up-sampled and calculated until the predicted attribute values of the bottom layer are calculated. Finally, residuals are calculated according to the predicted attribute values and actual attribute values of the child nodes, and the residuals are encoded.

The following describes a decoding process of RAHT.

An RAHT decoding process is inverse transform of an RAHT encoding process. The same as an encoding process, before inverse transform, a Morton code of each point is calculated in a point cloud, and after acquiring a Morton code M of each point, points in the point cloud are arranged in an order from small to large, and a weight of each point is set as 1. In an inverse RAHT process, all points in the point cloud are traversed according to an order after Morton codes are sorted.

As RAHT is performed hierarchically, starting from a bottom layer, adjacent points in a point cloud are determined layer by layer, and the RAHT is performed on attribute values according to weights. A process of inverse RAHT starts from a top layer and inverse RAHT is performed from top to bottom, so weight information of each layer needs to be obtained before inverse RAHT is performed.

Before inverse RAHT is performed, obtained Morton code information is used, from a bottom layer, a determination on adjacent nodes of each layer when RAHT is performed in a coder is performed, and weight information of each layer and a corresponding position of an AC coefficient may be obtained. For RAHT of each layer, left shift of a corresponding Morton code is performed by one bit. The weight information and Morton code information corresponding to nodes in each layer are recorded in a buffer, which is for later use.

In inverse RAHT, starting from a top layer, adjacent nodes are determined according to Morton code information of each layer, and the inverse RAHT is performed by using obtained weight information and attribute information obtained by decoding. RAHT inverse transform is equivalent to a process from the (k+1)-th layer to the k-th layer. When adjacent nodes are determined, traversed DC coefficients and corresponding AC coefficients are used for performing the inverse RAHT.

Based on background of the above introduction, a transform method is described in the following according to an embodiment of the present application, which is mainly applied to an encoder (a point cloud encoder) with a different way of determining a transform order during RAHT in an encoder framework. The location is shown in the dashed box in FIG. 1.

Figure 8:
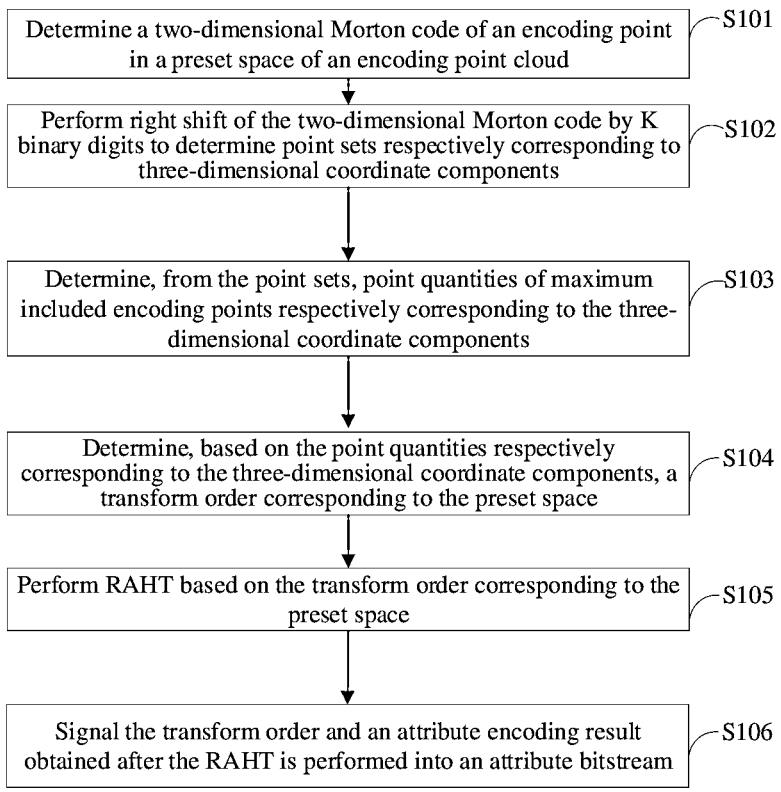
FIG. 8 is a first flow chart of a transform method according to an embodiment of the present application.

As shown in FIG. 8, an embodiment of the present application provides a transform method, which may include following acts S701 to S706.

In S101, a two-dimensional Morton code of an encoding point in a preset space of an encoding point cloud is determined, wherein the two-dimensional Morton code is a Morton code corresponding to a two-dimensional coordinate obtained by sequentially removing one of three-dimensional coordinate components of the encoding point.

In S102, right shift of the two-dimensional Morton code is performed by K binary digits to determine point sets respectively corresponding to three-dimensional coordinate components, wherein K is a positive integer greater than 1.

In S103, it is to determine, from the point sets, point quantities of maximum included encoding points respectively corresponding to the three-dimensional coordinate components.

In S104, a transform order corresponding to the preset space is determined based on the point quantities respectively corresponding to the three-dimensional coordinate components.

In S105, RAHT is performed based on the transform order corresponding to the preset space.

In S106, the transform order and an attribute encoding result obtained after the RAHT is performed are signalled into an attribute bitstream.

A transform method according to an embodiment of the present application is an RAHT method considering spatial distribution of point cloud and surface orientation, instead of adopting a fixed transform order, it analyzes a block to be transformed and spatial distribution (i.e., spatial distribution of the preset space) of point clouds contained in a preset neighborhood range before RAHT is performed, and determines an RAHT transform order according to a result of the analysis, thus acquiring better encoding performance.

In an embodiment of the present application, an encoding point cloud is point cloud data of the encoding point cloud as an object to be encoded in the present application. For one encoding point cloud, it may contain N points, that is, N encoding points, Wherein N is greater than or equal to 1. The encoder determines the two-dimensional Morton code of encoding point in a preset space in an encoding point cloud, and shifts right the two-dimensional Morton code by K binary digits, so as to count the point sets corresponding to respective coordinate components in the three-dimensional space, where the point set corresponding to each coordinate component represents the set where the points of the encoding point cloud are located in the main distribution set in the three-dimensional space. The encoder determines, from the point sets, point quantities of maximum included encoding points respectively corresponding to the three-dimensional coordinate components (i.e., respective coordinate components), and then determines, based on the point quantities respectively corresponding to the three-dimensional coordinate components, a transform order corresponding to the preset space. Since different point clouds have different spatial distributions, before RAHT is performed, the encoder may determine a transform order suitable for its own distribution characteristics according to spatial distribution characteristics of encoding points in each encoding point cloud, so that transform coefficients obtained through the RAHT performed by the encoder based on the transform order are less redundant, and therefore encoding efficiency can be improved.

It should be noted that, in an embodiment of the present application, since the determined transform order of each encoding point cloud may be different, when the transform order is determined, the encoder needs to signal the transform order in an attribute bitstream in an encoding process. For example, this transform order may be transmitted to a decoder with a 3-bit bitstream, so that the decoder can directly parse the bitstream to obtain a transform order for RAHT during decoding.

In an embodiment of this application, the encoding points are multiple objects in the encoding point cloud, and the encoder may, based on each encoding point, remove one of the three-dimensional coordinate components to obtain two-dimensional coordinates which correspond to the Morton codes, so that each encoding point corresponds to three types of two-dimensional Morton codes, that is, zy two-dimensional Morton code obtained by removing the x component, zx two-dimensional Morton code obtained by removing the y component and xy two-dimensional Morton code obtained by removing the z component. In this way, the three types of two-dimensional Morton codes of an encoding point are counted according to the coordinate components, and multiple x-component two-dimensional Morton codes corresponding to multiple encoding points when the x-coordinate components are removed, multiple y-component two-dimensional Morton codes corresponding to multiple encoding points when the y-coordinate components are removed, and multiple z-component two-dimensional Morton codes corresponding to multiple encoding points when the z-coordinate components are removed are counted. Here, multiple x-component two-dimensional Morton codes, multiple y-component two-dimensional Morton codes and multiple z-component two-dimensional Morton codes are collectively referred to as two-dimensional Morton codes of encoding points in the preset space in the encoding point cloud. Then, the encoder shifts right the two-dimensional Morton codes by K binary digits, so that the Morton codes corresponding to the adjacent points in the space will be equal. By using this approach, the adjacent points in the space may be divided into a point set, and then the point sets corresponding to each coordinate component in the three-dimensional coordinate component can be counted. Then, after removing the coordinate components x, y and z respectively, the encoder counts the point quantity of the maximum encoding points in the point sets corresponding to each coordinate component, that is, from the point sets, determines the point quantities of maximum included encoding points corresponding to the three coordinate components. Finally, the spatial distribution of the encoding point cloud can be determined by comparing the point quantities respectively corresponding to the three-dimensional coordinate components, so as to determine the transform order of the encoding points in the preset space. After the encoder determines the transform order of all the preset spaces in the encoding point cloud, it may perform RAHT on the encoding point cloud.

It should be noted that, in the embodiment of the present application, the order with the maximum point quantities respectively corresponding to the three-dimensional coordinate components is determined to be the transform order of the encoding points in the preset space, wherein the transform order corresponds to the order of the point quantities respectively corresponding to the three-dimensional coordinate components in ascending order.

It should be noted that the performing right shift in the present application refers to performing right shift of Morton code from the first digit.

In some embodiments of the present application, the preset space may be a slice, that is, the encoder partitions a point cloud space where the encoding point cloud is located into slices to obtain N slices; wherein the preset space is each slice of the N slices; and N is a positive integer greater than or equal to 1.

In some embodiments of the present application, the preset space may also be a space block arbitrarily partitioned for the encoding point cloud, which is not limited by the embodiments of the present application.

In some embodiments of the present application, the preset space may also be a partial space selected from the point cloud space where the encoding point cloud is located, while other spaces in the point cloud space excluding the partial space (which can be one or more) are subjected to RAHT according to a fixed transform order, for example, according to the zyx transform order, etc. That is, the implementation of RAHT is: performing RAHT based on the transform order corresponding to the preset space and performing RAHT based on the preset transform order (i.e., fixed transform order) corresponding to other spaces; wherein, the other spaces are the spaces excluding the preset space in the point cloud space.

That is to say, the encoder may first analyze the overall surface trend of the encoding point cloud, and then perform the RAHT on all the encoding point cloud based on this order, but may perform the RAHT on different spatial positions of the same encoding point cloud sequence based on different orders.

In some embodiments of the present application, after determining a two-dimensional Morton code of the encoding point in a preset space in an encoding point cloud, and before performing right shift of the two-dimensional Morton code by K binary digits to determine point sets respectively corresponding to three-dimensional coordinate components, the encoder performs iteration and traversal based on the two-dimensional Morton code to determine the K.

In the embodiment of the present application, the encoder may determine K in an RDO criterion.

Illustratively, a slice as the preset space is taken as an example. The encoding point cloud in the current slice contains N points represented as $P(i)(i=0,1 \ldots N-1)$, and the attribute information corresponding to each point is $A_n$, $n=0, 1, \ldots N-1$. The specific process is as follows.

(1) The encoder calculates the two-dimensional Morton codes of all encoding points in the slice after the X, Y and X components are respectively, and statistically obtains MortonX, MortonY, MortonZ corresponding to the respective coordinate components.

(2) The encoder shifts MortonX, MortonY and MortonZ to right by K binary digits respectively, wherein K may be determined by training based on RDO criterion.

(3) The encoder counts the point sets corresponding to respective coordinate components and counts the point quantities in point sets, wherein the point sets are obtained after the X, Y and Z components are removed respectively and right shift by K binary digits is performed. Assumed the point quantity of the maximum quantity of encoding points contained in the corresponding point set after the X component is removed is NumX, the point quantity of the maximum quantity of encoding points contained in the corresponding point set after the Y component is removed is NumY, and the point quantity of the maximum quantity of encoding points contained in the corresponding point set after the Z component is removed be NumY is NumZ.

(4) The encoder determines a transform order of RAHT performed in the preset space according to sizes of NumX, NumY and NumZ.

In an embodiment of the present application, the encoder determining, based on the point quantities respectively corresponding to the three-dimensional coordinate components, the transform order corresponding to the preset space, includes:

when the point quantities respectively corresponding to the three-dimensional coordinate components are NumX>NumY>NumZ, the transform order is determined to be zyx;

when the point quantities respectively corresponding to the three-dimensional coordinate components are NumX>NumZ>NumY, the transform order is determined to be yzx;

when the point quantities respectively corresponding to the three-dimensional coordinate components are NumY>NumX>NumZ, the transform order is determined to be zxy;

when the point quantities respectively corresponding to the three-dimensional coordinate components are NumY>NumZ>NumX, the transform order is determined to be xzy;

when the point quantities respectively corresponding to the three-dimensional coordinate components are NumZ>NumX>NumY, the transform order is determined to be yxz; and when the point quantities respectively corresponding to the three-dimensional coordinate components are NumZ>NumY>NumX, the transform order is determined to be xyz.

It should be noted that after obtains the RAHT transform order of each slice (corresponding to the preset space), the encoder transmits this RAHT transform order to the decoder as a header information parameter of each slice attribute transform, and the decoder may directly obtain the order of the RAHT direction to reconstruct the attribute of each slice.

The embodiment of the present application provides a method for determining the RAHT transform order to improve the encoding efficiency and encoding performance of the G-PCC attribute encoding part. By analyzing the spatial distribution of the encoding point cloud in each slice, the best RAHT transform order corresponding to each slice is determined.

It can be understood that by analyzing the spatial distribution of the encoding point cloud in each slice, the optimal RAHT transform order in each slice can be determined, the distribution of AC transform coefficients can be optimized, and the redundancy of AC coefficients can be removed, thus improving the encoding efficiency.

In some embodiments of the present application, the encoder needs to acquire K before performing right shift of the two-dimensional Morton code by K binary digits to determine point sets respectively corresponding to three-dimensional coordinate components. The specific implementation of acquiring K is as follows: acquiring a maximum side length of a point cloud space where the encoding point cloud is located; determining a geometric accuracy of the point cloud space based on the maximum side length; wherein the geometric accuracy is the number of binary digits corresponding to the maximum side length represented by binary; and determining the K based on the geometric accuracy.

In an embodiment of the present application, the encoder puts the points in the encoding point cloud into a Bounding Box block (corresponding to the point cloud space), all the points are contained in the block, and the geometric accuracy d of the Bounding Box is calculated. When the longest side of the point cloud space is known, the longest side may be expressed as $2^d$ to determine the value of d. By analyzing the geometric accuracy d, the optimal right shift binary digit numbers Ks of Morton codes corresponding to different sequences are adaptively determined.

It should be noted that, after obtaining d, the encoder may use a value around d as K, specific implementations of which are not limited in this application.

In some embodiments of the present application, after determining the two-dimensional Morton code of the encoding point in a preset space in an encoding point cloud, and before performing right shift of the two-dimensional Morton code by K binary digits to determine point sets respectively corresponding to three-dimensional coordinate components, the encoder needs to acquire K firstly, the specific implementation of which is as follows: determining a difference value between a maximum value and a minimum value in the two-dimensional Morton code; determining a quotient of the difference value and a point quantity of the encoding points; determining the number of binary digits by which the quotient is shifted to equal to zero; and determining the K based on the number of binary digits.

In the embodiment of the present application, the right shift binary digit number K of Morton codes may be determined by analyzing the spatial density of different point clouds and averaging the differences of Morton codes of every adjacent point. Here, the encoder needs to sort the two-dimensional Morton codes of all encoding points in the preset space, then subtract the minimum value from the maximum value of the sorted two-dimensional Morton codes, and then determine the number of binary digits by which the quotient of the difference and the point quantity of the encoding points is shifted to equal to 0, that is, determine the number of binary digits by which the quotient is shifted to equal to zero. Finally, the encoder uses the ROD criterion to train the K value based on the number of binary digits.

It can be understood that since the encoder counts the point quantities corresponding to each coordinate component of the three-dimensional coordinate components through the two-dimensional Morton code of the encoding point in the preset space for the realization of RAHT in a process of attribute encoding, finally the transform order of RAHT is determined based on the point quantities corresponding to the three-dimensional coordinate components. In this way, considering the point quantities corresponding to the three-dimensional coordinate components, transform in a direction with a significant feature is prioritized, thus achieving purposes of reducing redundancy of transform coefficients obtained through transform and improving encoding and decoding efficiency.

In some embodiments of the present application, S105 in the transform method provided by the present application, i.e., performing RAHT based on the transform order corresponding to the preset space includes:

In S1051, transform direction and order corresponding to the preset space and forming preset angles with coordinate components are determined based on the transform order corresponding to the preset space.

In S1052, a three-dimensional Morton code of an encoding point is acquired.

In S1053, the RAHT is performed based on the transform direction and order and the three-dimensional Morton code.

In an embodiment of the present application, the encoder calculates the corresponding two-dimensional Morton codes by removing the X, Y and Z components respectively, but the Morton codes (three-dimensional) of different three-dimensional point cloud sequences (that is, the encoding point clouds) should be consistent with surface trends (two-dimensional) of the encoding point clouds, and encoding may be performed through the Morton codes of different point clouds according to different directions. That is, the encoder determines, based on the transform order corresponding to the preset space, the transform direction and order corresponding to the preset space and forming preset angles with coordinate components; acquires a three-dimensional Morton code of the encoding point; and performed the RAHT based on the transform directions and order and the three-dimensional Morton code.

In an embodiment of the present application, the process of determining, by an encoder, based on the transform order corresponding to the preset space, the transform directions and order corresponding to the preset space and forming preset angles with coordinate components is implemented as follows: after the encoder determines the transform order corresponding to the preset space based on the above embodiment, the encoder may further determine the transform directions and order with a preset angle with each coordinate component according to the transform order, and then perform RAHT according to the three-dimensional Morton code based on the transform directions and order.

For example, the preset angle may be 45 degrees, then when the transform order is xyz, the transform directions and order are as follows: x is along an angle of 45 degrees between x and z, y is along an angle of 45 degrees between x and y, and z is along an angle of 45 degrees between x and z. Then, the transform directions and order are: first along the 45-degree angle between x and z, then along the 45-degree angle between x and y, and finally along the 45-degree angle between x and z.

It should be noted that the preset angles and numerical values correspond to the coordinate components may the same or different, and the specific numerical values may be set arbitrarily. In addition, the angular deflection direction may also be set arbitrarily, and the embodiments of this application are not limited here.

It can be understood that the encoder may not directly use the coordinate axis direction to perform RAHT, and may perform RAHT based on the preset angle, which improves the diversity of implementing the RAHT.

In some embodiments of the present application, the S1052, that is, acquiring the three-dimensional Morton code of the encoding point, is implemented as follows: determining respective side lengths of three-dimensional coordinate components in a point cloud space where an encoding point cloud is located; determining, based on the respective side lengths of the three-dimensional coordinate components, weight values respectively corresponding to the three-dimensional coordinate components; encoding the encoding point in the encoding point cloud based on the weight values to obtain a three-dimensional Morton code In an embodiment of the present application, in an encoding process of attribute, after a point cloud is recolored, at this time, geometric coordinate information of the encoding point in the point cloud may be obtained. The encoder may obtain Morton code (three-dimensional) corresponding to each point in the point cloud by using the geometric coordinate information of the encoding point. After acquiring the spatial position of the encoding point cloud, that is, the coordinate information, the space where the encoding point cloud is located may be regarded as the point cloud space, and the point cloud space may be a cuboid, then the encoder may obtain respective side lengths of the three-dimensional coordinate components of the point cloud space, that is, the side lengths along the x axis, the side lengths along the y axis and the side lengths along the z axis. Then the respective proportions, that is, the weight value, of the encoding point cloud in the three-dimensional coordinate components may be determined based on the respective side lengths of the three-dimensional coordinate components. Finally, when the encoding points in the encoding point cloud are encoded, the weight value corresponding to the coordinate component, rather than the current 1:1:1 mode with the same weight, is used for encoding to acquire the three-dimensional Morton code.

That is to say, the X, Y and Z dimensions of different point cloud sequences (encoding point clouds) should occupy different proportions, Morton encoding for the three dimensions should be performed based on the proportions of different components of the point cloud, so that the RAHT based on Morton code can well adapt to the surface trend of the point cloud.

In an embodiment of the present application, the encoder also needs to signal the weight values into the bitstream and transmit them to the decoder for use.

In an embodiment of the present application, the determination principle of the weight values is: determining the weight values according to the trend of the point cloud, that is, determining the weight values according to the side lengths of respective coordinate components. The weight values may be determined by ratios of respective side lengths to the sum of the total side lengths or a ratio of the side lengths, which is not limited by the embodiments of the present application.

It should be noted that a sum of the weight values of respective coordinate components is 1.

Further, in S105, the encoder also needs to first acquire a three-dimensional Morton code of the encoding point, and then performs RAHT based on the transform order and the three-dimensional Morton code of the encoding point, wherein the three-dimensional Morton code of the encoding point may also be obtained by encoding with the weight values corresponding to the respective coordinate components, which is not limited by the embodiments of the present application.

It can be understood that Morton encoding of the encoding point cloud without using coordinate components considers the trend of the encoding point cloud, can better achieve RAHT, and can improve the RAHT accuracy and the encoding efficiency.

Figure 9:
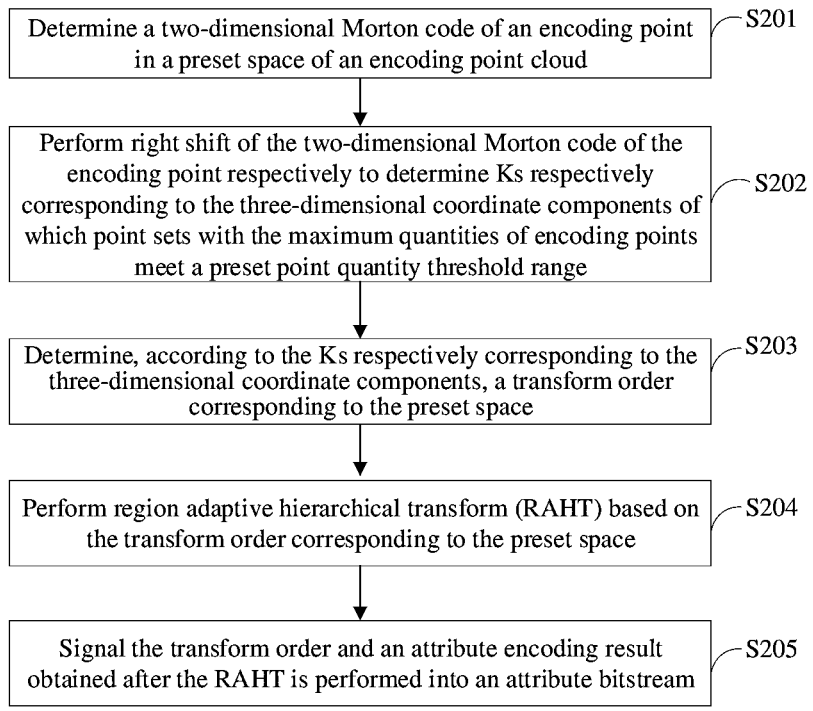
FIG. 9 is a second flow chart of a transform method according to an embodiment of the present application.

As shown in FIG. 9, an embodiment of the present application provides a transform method, which may include the following acts S201 to S205.

In S201, a two-dimensional Morton code of an encoding point in a preset space in an encoding point cloud is determined.

Description for the implementation of S201 in an embodiment of the present application is consistent with the description for the implementation of S101, and will not be repeated here.

In S202, right shift of the two-dimensional Morton code of the encoding point is respectively performed to determine the Ks respectively corresponding to the three-dimensional coordinate components of which point sets with maximum quantities of encoding points meet a preset point quantity threshold range.

In S203, a transform order corresponding to the preset space is determined according to the Ks respectively corresponding to the three-dimensional coordinate components.

In an embodiment of the present application, after the encoder acquires the two-dimensional Morton code of the encoding point, the encoder may respectively perform right shift of the coordinate components of the two-dimensional Morton code of the encoding point until the point set with the maximum quantity of encoding points meets the preset point quantity threshold range. At this time, the shift binary digit number of each coordinate component is the K value corresponding to each coordinate component. The encoder may determine the K corresponding to each coordinate component based on the K corresponding to each coordinate component to determine the transform order corresponding to the preset space.

In an embodiment of the present application, the order with the most K in the Ks corresponding to respective coordinate components is determined to be the transform order of the encoding points in the preset space, wherein the transform order corresponds to the order of the Ks respectively corresponding to the three-dimensional coordinate components in ascending order.

In an embodiment of the present application, the preset point quantity threshold range may be between 16 and 32, or it can be set for themselves, and the embodiments of this application are not limited thereto.

In an embodiment of the present application, the determining, by an encoder, the transform order corresponding to the preset space according to the K respectively corresponding to the three-dimensional coordinate components includes:

when Ks respectively corresponding to the three-dimensional coordinate components are $K(X)<K(Y)<K(Z)$, the transform order is determined to be zyx;

when Ks respectively corresponding to the three-dimensional coordinate components are $K(X)<K(Z)<K(Y)$, the transform order is determined to be yzx;

when Ks respectively corresponding to the three-dimensional coordinate components are $K(Y)<K(X)<K(Z)$, the transform order is determined to be zxy;

when Ks respectively corresponding to the three-dimensional coordinate components are $K(Y)<K(Z)<K(X)$, the transform order is determined to be xzy;

when Ks respectively corresponding to the three-dimensional coordinate components are $K(Z)<K(X)<K(Y)$, the transform order is determined to be yxz; and when Ks respectively corresponding to the three-dimensional coordinate components are $K(Z)<K(Y)<K(X)$, the transform order is determined to be xyz.

In S204, Region Adaptive Hierarchical Transform (RAHT) is performed based on the transform order corresponding to the preset space.

In an embodiment of the present application, the encoder calculates the two-dimensional Morton codes after removing the X, Y, and Z three-dimensional dimensions respectively, and then shifts right by K binary digits to count the point quantity of points in the maximum point set respectively, so as to determine the transform order of the point cloud sequence by this method. Furthermore, the two-dimensional Morton codes calculated after X, Y and Z are respectively removed are shifted right by different binary digit numbers Ks, and the point quantity in each maximum point set is controlled to be within an equal proportion range threshold (preset point quantity threshold range) of the total point quantity of the point cloud space. And by comparing different right shift binary digit numbers Ks, the largest right shift binary digits K is taken as a main direction of the point cloud sequence. Assuming that the two-dimensional Morton codes calculated after the three dimensions of X, Y and Z are removed respectively, the numbers of binary digits shifted right are $K(x)$, $K(y)$ and $K(z)$. When $K(x)<K(y)<K(z)$, the order of RAHT is first along the Z direction, then along the Y direction and finally along the X direction. Herein Ks corresponding to respective coordinate components are different.

Description for an implementation of S204 in an embodiment of the present application is consistent with the description for the implementation of S105, and will not be repeated here.

In S205, the transform order and an attribute encoding result obtained after the RAHT is performed are signalled into an attribute bitstream.

Description for an implementation of S205 in an embodiment of the present application is consistent with the description for the implementation of S106, and will not be repeated here.

It can be understood that, since the encoder counts the corresponding right shift binary digit numbers Ks of the three-dimensional coordinate components of which the point sets with the maximum quantities of encoding points meet a preset point quantity threshold range through the two-dimensional Morton code of the encoding point in the preset space for the realization of RAHT in the process of attribute encoding, the transform order of RAHT is finally determined based on the right shift binary digit numbers Ks of the three-dimensional coordinate components. In this way, considering the right shift binary digit numbers Ks of the three-dimensional coordinate components, transform in a direction with a significant feature is prioritized, thus achieving purposes of reducing redundancy of transform coefficients obtained through transform and improving encoding and decoding efficiency.

In an embodiment of the present application, adoption of a determination method to determine a better RAHT transform order may bring performance gains to point cloud reconstruction. As shown in Table 1 below, a Peak Signal/Noise Ratio (PSNR) of point cloud reconstruction is reduced, and a Bjontegaard Delta rate (BD-rate) is also significantly improved. (A PSNR is an objective criteria for picture evaluation. The larger the PSNR is, the better the picture quality is. A BD-rate is a parameter used for measuring performance. When the BD-rate is negative, it is indicated that performance becomes better. On this basis, the greater the absolute value of BD-rate is, the greater the performance gain is.)

Figure 10:
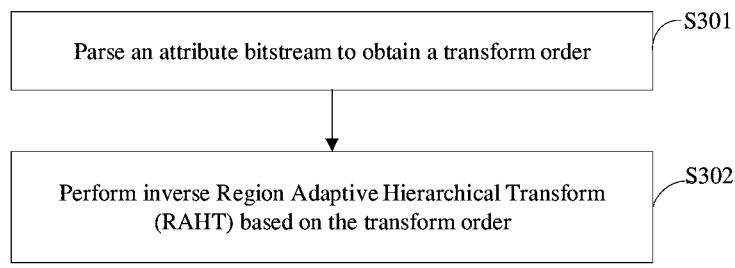
FIG. 10 is a flow chart of an inverse transform method according to an embodiment of the present application.

As shown in FIG. 10, an embodiment of the present application provides an inverse transform method, which is applied to a decoder and includes following acts S301 to S302.

In S301, an attribute bitstream is parsed to obtain a transform order.

In S302, inverse Region Adaptive Hierarchical Transform (RAHT) is performed based on the transform order.

In an embodiment of the present application, when an encoded bitstream is transmitted to a decoder, the decoder may parse an attribute bitstream in the encoded bitstream to obtain a transform order, and then the transform order may be used when the decoder performs inverse RAHT.

It may be understood that an encoder uses spatial distribution characteristics of an encoding point cloud to obtain an optimal transform order of RAHT corresponding to each encoding point cloud. In this way, when the surface trend of the preset space of the point cloud is considered, transform in a direction with a significant feature is prioritized, thus achieving purposes of reducing redundancy of transform coefficients obtained through transform and improving encoding and decoding efficiency. Since a transform order corresponding to an encoding point cloud in each preset space may be different, a transform order needs to be encoded and signaled in an attribute bitstream during encoding, so that the decoder can decode and parse the transform order, and use the transform order for performing RAHT inverse transform.

Figure 11:
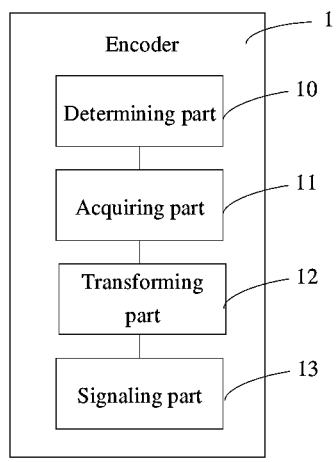
FIG. 11 is a first schematic diagram of a structure of an encoder according to an embodiment of the present application.

Based on an implementation basis of the foregoing embodiments, as shown in FIG. 11, an embodiment of the present application provides an encoder 1, which includes a determining part 10, an acquisition part 11, a transforming part 12 and a signaling part 13.

The determining part 10 is configured to determine a two-dimensional Morton code of an encoding point in a preset space of an encoding point cloud; wherein the two-dimensional Morton code is a Morton code corresponding to two-dimensional coordinates obtained by sequentially removing one of three-dimensional coordinate components of the encoding point.

TABLE 1

| Point Cloud File | Number of Partitioned Slices | Transform Directions Adopted by Different Slices | BD rate | | |
|---|---|---|---|---|---|
| | | | Y | U | V |
| basketball_player_vox11_00000200 | 4 | xzy, xzy, zxy, zxy | −2.8% | −1.3% | 0% |
| egyptian_mask_vox12 | 1 | Zxy | −0.9% | −2.0% | −0.6% |
| loot_viewdep_vox12 | 5. | xzy, zxy, xyz, zyx, zxy | −0.9% | −1.2% | −1.5% |
| loot_vox10_1200 | 1 | Xzy | −1.7% | −4.3% | −4.6% |
| soldier_vox10_0690 | 1 | Xzy | −1.3% | −2.4% | −5.1% |
| ulb_unicorn_vox13 | 2 | yxz, xyz | −2.9% | −4.7% | −3.7% |

As can be seen from Table 1, RAHT is performed for data of six point clouds with different transform orders corresponding to respective slices, and Average gains obtained are all remarkable, greatly improving performance of the encoder.

Based on background of the foregoing introduction, the following describes an inverse transform method according to an embodiment of the present application, which is mainly applied to a decoder (a point cloud decoder) with a process of acquiring a transform order during inverse RAHT in a decoder framework. The location is shown in the dashed box in FIG. 2.

The acquisition part 11 is configured to perform right shift of the two-dimensional Morton code by K binary digits to determine point sets respectively corresponding to three-dimensional coordinate components; wherein K is a positive integer greater than 1.

The determining part 10 is further configured to determine, from the point sets, the point quantities of maximum included encoding points respectively corresponding to the three-dimensional coordinate components; and determine, based on the point quantities respectively corresponding to the three-dimensional coordinate components, a transform order corresponding to the preset space.

The transforming part 12 is configured to carry out Region Adaptive Hierarchical Transform (RAHT) based on the transform order corresponding to the preset space.

The signaling part 13 is configured to signal the transform order and an attribute encoding result obtained after the RAHT is performed into an attribute bitstream.

In some embodiments of this application, the determining part 10 is further configured to partition the point cloud space where the encoding point cloud is located into slices to obtain N slices before determining the two-dimensional Morton code of the encoding point in a preset space in an encoding point cloud; wherein the preset space is each slice of the N slices; and N is a positive integer greater than or equal to 1.

In some embodiments of the present application, the determining part 10 is further configured to perform iteration and traversal based on the two-dimensional Morton code to determine the K after determining the two-dimensional Morton code of the encoding point in a preset space in an encoding point cloud, and before performing right shift of the two-dimensional Morton code by K binary digits to determine point sets respectively corresponding to three-dimensional coordinate components.

In some embodiments of the present application, the acquisition part 11 is further configured to acquire a maximum side length of the point cloud space where the encoding point cloud is located before performing right shift of each of the two-dimensional Morton by K binary digits to determine point sets respectively corresponding to three-dimensional coordinate components.

The determining part 10 is further configured to determine the geometric accuracy of the point cloud space based on the maximum side length; wherein, the geometric accuracy is the number of binary digits corresponding to the maximum side length represented by binary; and determining the K based on the geometric accuracy.

In some embodiments of the present application, the determining part 10 is further configured to after determining the two-dimensional Morton code of the encoding point in a preset space in an encoding point cloud, and before performing right shift of the two-dimensional Morton code by K binary digits to determine point sets respectively corresponding to three-dimensional coordinate components, determine a difference value between the maximum value and the minimum value in the two-dimensional Morton code; determine a quotient of the difference value and the point quantity of the encoding points; determine the number of binary digits by which the quotient is shifted to equal to zero; and determine the K based on the number of binary digits.

In some embodiments of the present application, the determining part 10 is further configured to determine, based on the transform order corresponding to the preset space, the transform directions and order corresponding to the preset space and forming a preset angle with each coordinate component.

The acquiring part 11 is further configured to acquire a three-dimensional Morton code of the encoding point.

The transforming part 12 is further configured to perform the RAHT based on the transform directions and order and the three-dimensional Morton code.

In some embodiments of the present application, the acquiring part 11 is further configured to determine respective side lengths of three-dimensional coordinate components in the point cloud space where the encoding point cloud is located; determine, based on the respective side lengths of the three-dimensional coordinate components, the weight values respectively corresponding to the three-dimensional coordinate components; and code the encoding points in the encoding point cloud based on the weight values to obtain a three-dimensional Morton code.

In some embodiments of the present application, the determining part 11 is further configured to select part of the point cloud space where the encoding point cloud is located as the preset space before the two-dimensional Morton code of the encoding point in a preset space in an encoding point cloud is determined.

In some embodiments of the present application, the transforming part 12 is further configured to perform RAHT based on the transform order corresponding to the preset space and the preset transform order corresponding to other spaces; wherein, the other spaces are spaces excluding the preset space in the point cloud space.

In some embodiments of the present application, the determining part 10 is further configured to, after determining the two-dimensional Morton code of the encoding point in a preset space in an encoding point cloud, and before performing Region Adaptive Hierarchical Transform (RAHT) based on the transform order corresponding to the preset space, respectively perform right shift of the two-dimensional Morton code of the encoding point, and determine the Ks respectively corresponding to the three-dimensional coordinate components of which point sets with the maximum quantities of encoding points meet a preset point quantity threshold range; and determine, according to the K respectively corresponding to the three-dimensional coordinate components, the transform order corresponding to the preset space.

In some embodiments of the present application, the determining part 10 is further configured to determine the transform order to be zyx when the point quantities respectively corresponding to the three-dimensional coordinate components are NumX>NumY>NumZ;

determine the transform order to be yzx when the point quantities respectively corresponding to the three-dimensional coordinate components are NumX>NumZ>NumY;

determine the transform order to be zxy when the point quantities respectively corresponding to the three-dimensional coordinate components are NumY>NumX>NumZ;

determine the transform order to be xzy when the point quantities respectively corresponding to the three-dimensional coordinate components are NumY>NumZ>NumX;

determine the transform order to be yxz when the point quantities respectively corresponding to the three-dimensional coordinate components are NumZ>NumX>NumY; and determine the transform order to be xyz when the point quantities respectively corresponding to the three-dimensional coordinate components are NumZ>NumY>NumX.

In some embodiments of the present application, the determining part 10 is further configured to, determine the transform order to be zyx when Ks respectively corresponding to the three-dimensional coordinate components are K(X)<K(Y)<K(Z);

determine the transform order to be yzx when Ks respectively corresponding to the three-dimensional coordinate components are K(X)<K(Z)<K(Y);

determine the transform order to be zxy when K respectively corresponding to the three-dimensional coordinate components are K(Y)<K(X)<K(Z);

determine the transform order to be xzy when K respectively corresponding to the three-dimensional coordinate components are K(Y)<K(Z)<K(X);

determine the transform order to be yxz when K respectively corresponding to the three-dimensional coordinate components are K(Z)<K(X)<K(Y); and determine the transform order to be xyz when K respectively corresponding to the three-dimensional coordinate components are K(Z)<K(Y)<K(X).

It can be understood that since the encoder counts the point quantities corresponding to each coordinate component of the three-dimensional coordinate components through the two-dimensional Morton code of the encoding point in the preset space for the realization of RAHT in a process of attribute encoding, the transform order of RAHT is finally determined based on the point quantities corresponding to the three-dimensional coordinate components. In this way, considering the point quantities corresponding to the three-dimensional coordinate components, transform in a direction with a significant feature is prioritized, thus achieving purposes of reducing redundancy of transform coefficients obtained through transform and improving encoding and decoding efficiency.

Figure 12:
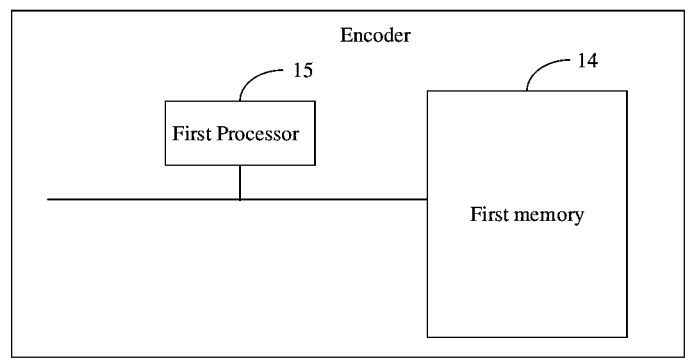
FIG. 12 is a second schematic diagram of a structure of an encoder according to an embodiment of the present application.

In a practical application, as shown in FIG. 12, an embodiment of the present application further provides an encoder, including a first memory 14 and a first processor 15.

The first memory 14 is configured to store executable instructions.

The first processor 15 is configured to implement a transform method on an encoder when executing the executable instructions stored in the first memory 14.

The processor may be achieved by software, hardware, firmware, or their combination. Circuits, single or multiple application specific integrated circuits (ASIC), single or multiple general integrated circuits, single or multiple microprocessors, single or multiple programmable logic devices, or the combination of the aforementioned circuits or devices, or other suitable circuits or devices may be used, so that the processor may implement corresponding acts of the transform method in the aforementioned embodiments.

An embodiment of the present application provides a computer-readable storage medium including executable instructions stored thereon, wherein a transform method on an encoder is implemented when the executable instructions are executed by a first processor.

Various components in the embodiments of the present application may be integrated into one processing unit, or various units may exist physically and separately, or two or more than two units may be integrated into one unit. The integrated units may be implemented in a form of hardware, or may be implemented in a form of a software functional module.

The integrated unit, if implemented in the form of a software functional module and sold or used as an independent product, may be stored in a computer readable storage medium. Based on such understanding, the technical solutions of the embodiment, in essence, or a part contributing to the prior art, or all or part of the technical solutions, may be embodied in a form of a software product, and the computer software product is stored in a storage medium, and includes several instructions for enabling a computer device (which may be a personal computer, a server, or a network device, etc.) or a processor to perform all or part of the acts of the methods in the embodiment. The aforementioned storage medium may be various media that may store program codes, such as a ferromagnetic random access memory (FRAM), a Read Only Memory (ROM), a Programmable Read-Only Memory (PROM), an Erasable Programmable Read-Only Memory (EPROM), an Electrically Erasable Programmable Read-Only Memory (EEPROM), a Flash Memory, a magnetic surface memory, a compact disk, or a Compact Disc Read-Only Memory (CD-ROM), which is not limited in the embodiments of the present application.

Figure 13:
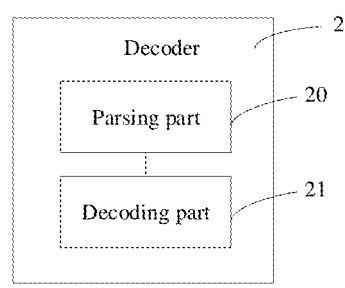
FIG. 13 is a first schematic diagram of a structure of a decoder according to an embodiment of the present application.

As shown in FIG. 13, an embodiment of the present application further provides a decoder, including a parsing part 20 and a decoding part 21.

The parsing part 20 is configured to parse an attribute bitstream to obtain a transform order.

The decoding part 21 is configured to perform inverse Region Adaptive Hierarchical Transform (RAHT) based on the transform order.

Figure 14:
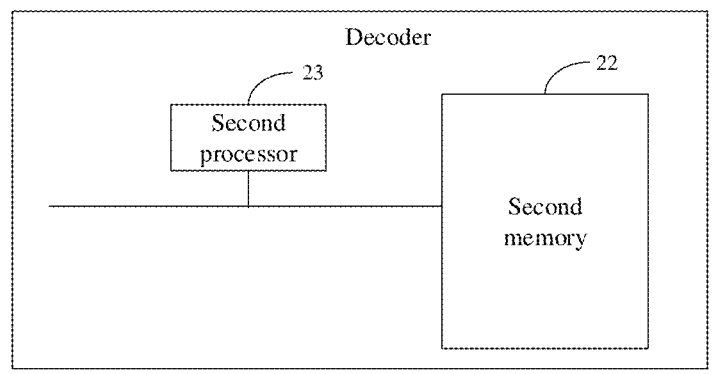
FIG. 14 is a second schematic diagram of a structure of a decoder according to an embodiment of the present application.

In a practical application, as shown in FIG. 14, an embodiment of the present application further provides a decoder, including a second memory 22 and a second processor 23.

The second memory 22 is configured to store executable instructions.

The second processor 23 is configured to implement an inverse transform method on a decoder when executing the executable instructions stored in the second memory 22.

An embodiment of the present application provides a computer-readable storage medium including executable instructions stored thereon, wherein a inverse transform method on a decoder is implemented when the executable instructions are executed by a second processor.

It may be understood that an encoder uses spatial distribution characteristics of an encoding point cloud to obtain an optimal transform order of RAHT corresponding to each encoding point cloud. In this way, when the surface trend of the preset space of the point cloud is considered, transform in a direction with a significant feature is prioritized, thus achieving purposes of reducing redundancy of transform coefficients obtained through transform and improving encoding and decoding efficiency. Since a transform order corresponding to an encoding point cloud in each preset space may be different, a transform order needs to be encoded and signaled in an attribute bitstream during encoding, so that the decoder can decode and parse the transform order, and use the transform order for performing RAHT inverse transform.

INDUSTRIAL APPLICABILITY

Provided in the embodiments of the present application are a transform method, an inverse transform method, an encoder, a decoder and a computer-readable storage medium. Since the encoder counts the point quantities corresponding to each coordinate component of the three-dimensional coordinate components through the two-dimensional Morton code of the encoding point in the preset space for the realization of RAHT in a process of attribute encoding, the transform order of RAHT is finally determined based on the point quantities corresponding to the three-dimensional coordinate components. In this way, considering the point quantities corresponding to the three-dimensional coordinate components, transform in a direction with a significant feature is prioritized, thus achieving purposes of reducing redundancy of transform coefficients obtained through transform and improving encoding and decoding efficiency.

The invention claimed is:

1. A transform method, applied to an encoder, comprising:
  determining a two-dimensional Morton code of an encoding point in a preset space of an encoding point cloud, wherein the two-dimensional Morton code of the encoding point is a Morton code corresponding to two-dimensional coordinates of the encoding point obtained by removing one of three-dimensional coordinate components of the encoding point;
  performing right shift of the two-dimensional Morton code by K binary digits to determine point sets respectively corresponding to three-dimensional coordinate components, wherein K is a positive integer greater than 1;
  determining, from the point sets, point quantities of maximum comprised encoding points respectively corresponding to the three-dimensional coordinate components;
  determining, based on the point quantities respectively corresponding to the three-dimensional coordinate components, a transform order corresponding to the preset space;
  performing Region Adaptive Hierarchical Transform (RAHT) based on the transform order corresponding to the preset space; and
  signaling the transform order and an attribute encoding result obtained after the RAHT is performed into a bitstream.

2. The method of claim 1, wherein, before determining the two-dimensional Morton code of the encoding point, in the preset space of the encoding point cloud, the method further comprises:
  partitioning a point cloud space where the encoding point cloud is located into slices to obtain N slices; wherein the preset space is each slice of the N slices; and N is a positive integer greater than or equal to 1.

3. The method of claim 1, wherein, after determining the two-dimensional Morton code of the encoding point in the preset space of the encoding point cloud, and before performing right shift of the two-dimensional Morton code by K binary digits to determine point sets respectively corresponding to three-dimensional coordinate components, the method further comprises:
  performing iteration and traversal based on the two-dimensional Morton code to determine the K.

4. The method of claim 1, wherein, before performing right shift of the two-dimensional Morton code by K binary digits to determine point sets respectively corresponding to three-dimensional coordinate components, the method further comprises:
  acquiring a maximum side length of a point cloud space where the encoding point cloud is located;
  determining a geometric accuracy of the point cloud space based on the maximum side length; wherein, the geometric accuracy is a number of binary digits corresponding to the maximum side length represented by binary; and
  determining the K based on the geometric accuracy.

5. The method of claim 1, wherein, after determining the two-dimensional Morton code of the encoding point in the preset space of the encoding point cloud, and before performing right shift of the two-dimensional Morton code by K binary digits to determine point sets respectively corresponding to three-dimensional coordinate components, the method further comprises:
  determining a difference value between a maximum value and a minimum value in the two-dimensional Morton code;
  determining a quotient of the difference value and a point quantity of encoding points;
  determining a number of binary digits by which the quotient is shifted to equal to zero; and
  determining the K based on the number of binary digits.

6. The method of claim 1, wherein the performing RAHT based on the transform order corresponding to the preset space comprises:
  determining, based on the transform order corresponding to the preset space, transform directions and order corresponding to the preset space and forming preset angles with respective coordinate components;
  acquiring a three-dimensional Morton code of the encoding point; and
  performing the RAHT based on the transform directions and order and the three-dimensional Morton code.

7. The method of claim 6, wherein the acquiring the three-dimensional Morton code of the encoding point comprises:
  determining respective side lengths of three-dimensional coordinate components in a point cloud space where the encoding point cloud is located;
  determining, based on the respective side lengths of the three-dimensional coordinate components, weight values respectively corresponding to the three-dimensional coordinate components; and
  coding the encoding point in the encoding point cloud based on the weight values to obtain the three-dimensional Morton code.

8. The method of claim 1, wherein, before determining the two-dimensional Morton code of the encoding point in the preset space of the encoding point cloud, the method further comprises:
  selecting part of a point cloud space where the encoding point cloud is located as the preset space.

9. The method of claim 8, wherein the performing RAHT based on the transform order corresponding to the preset space comprises:
  performing RAHT based on the transform order corresponding to the preset space and a preset transform order corresponding to other spaces; wherein, the other spaces are spaces excluding the preset space in the point cloud space.

10. The method of claim 1, wherein after determining the two-dimensional Morton code of the encoding point in the preset space of the encoding point cloud, and before performing Region Adaptive Hierarchical Transform (RAHT) based on the transform order corresponding to the preset space, the method further comprises:
  respectively performing right shift of the two-dimensional Morton code of the encoding point to determine Ks respectively corresponding to the three-dimensional coordinate components of which point sets with maximum quantities of encoding points meet a preset point quantity threshold range; and
  determining, according to the Ks respectively corresponding to the three-dimensional coordinate components, the transform order corresponding to the preset space.

11. The method of claim 1, wherein the determining, based on the point quantities respectively corresponding to the three-dimensional coordinate components, the transform order corresponding to the preset space comprises:

determining the transform order to be zyx when the point quantities respectively corresponding to the three-dimensional coordinate components are NumX>NumY>NumZ;

determining the transform order to be yzx when the point quantities respectively corresponding to the three-dimensional coordinate components are NumX>NumZ>NumY;

determining the transform order to be zxy when the point quantities respectively corresponding to the three-dimensional coordinate components are NumY>NumX>NumZ;

determining the transform order to be xzy when the point quantities respectively corresponding to the three-dimensional coordinate components are NumY>NumZ>NumX;

determining the transform order to be yxz when the point quantities respectively corresponding to the three-dimensional coordinate components are NumZ>NumX>NumY; and determining the transform order to be xyz when the point quantities respectively corresponding to the three-dimensional coordinate components are NumZ>NumY>NumX.

12. The method of claim 10, wherein the determining, according to the Ks respectively corresponding to the three-dimensional coordinate components, the transform order corresponding to the preset space comprises:

determining the transform order to be zyx when Ks respectively corresponding to the three-dimensional coordinate components are K(X)<K(Y)<K(Z);

determining the transform order to be yzx when Ks respectively corresponding to the three-dimensional coordinate components are K(X)<K(Z)<K(Y);

determining the transform order to be zxy when Ks respectively corresponding to the three-dimensional coordinate components are K(Y)<K(X)<K(Z);

determining the transform order to be xzy when Ks respectively corresponding to the three-dimensional coordinate components are K(Y)<K(Z)<K(X);

determining the transform order to be yxz when Ks respectively corresponding to the three-dimensional coordinate components are K(Z)<K(X)<K(Y); and determining the transform order to be xyz when Ks respectively corresponding to the three-dimensional coordinate components are K(Z)<K(Y)<K(X).

13. An inverse transform method, applied to a decoder, comprising:

parsing a bitstream to obtain information indicating a transform order of a point cloud; and performing inverse Region Adaptive Hierarchical Transform (RAHT) based on the information indicating the transform order of the point cloud;

wherein the performing the inverse RAHT based on the information indicating the transform order of the point cloud comprises:

determining the transform order of the point cloud based on the information indicating the transform order of the point cloud; and performing the inverse RAHT based on the transform order of the point cloud.

14. The method of claim 13, wherein the performing the inverse RAHT based on the transform order of the point cloud comprises:

determining, based on the transform order of the point cloud, transform directions and order corresponding to the point cloud and forming preset angles with respective coordinate components;

acquiring a three-dimensional Morton code of a point of the point cloud; and performing the inverse RAHT based on the transform directions and order and the three-dimensional Morton code.

15. The method of claim 13, wherein the transform order of the point cloud is determined based on point quantities respectively corresponding to three-dimensional coordinate components; the point quantities respectively corresponding to three-dimensional coordinate components are point quantities of maximum comprised points respectively corresponding to the three-dimensional coordinate components in point sets respectively corresponding to the three-dimensional coordinate components; the point sets respectively corresponding to the three-dimensional coordinate components are obtained by performing right shift of two-dimensional Morton codes of points in the point cloud by K binary digits; and the two-dimensional Morton code is a Morton code corresponding to two-dimensional coordinates of a point obtained by removing one of three-dimensional coordinate components of the point.

16. The method of claim 15, wherein the transform order of the point cloud being determined based on the point quantities respectively corresponding to the three-dimensional coordinate components comprises:

determining the transform order of the point cloud to be zyx when the point quantities respectively corresponding to the three-dimensional coordinate components are NumX>NumY>NumZ;

determining the transform order of the point cloud to be yzx when the point quantities respectively corresponding to the three-dimensional coordinate components are NumX>NumZ>NumY;

determining the transform order of the point cloud to be zxy when the point quantities respectively corresponding to the three-dimensional coordinate components are NumY>NumX>NumZ;

determining the transform order of the point cloud to be xzy when the point quantities respectively corresponding to the three-dimensional coordinate components are NumY>NumZ>NumX;

determining the transform order of the point cloud to be yxz when the point quantities respectively corresponding to the three-dimensional coordinate components are NumZ>NumX>NumY; and determining the transform order of the point cloud to be xyz when the point quantities respectively corresponding to the three-dimensional coordinate components are NumZ>NumY>NumX.

17. The method of claim 13, wherein the transform order of the point cloud is determined according to Ks respectively corresponding to three-dimensional coordinate components, the Ks respectively corresponding to the three-dimensional coordinate components are determined by respectively performing right shift of two-dimensional Morton codes of points to enable that point sets with maximum quantities of points meet a preset point quantity threshold range; and the two-dimensional Morton code is a Morton code corresponding to two-dimensional coordinates of a point obtained by removing one of three-dimensional coordinate components of the point.

18. The method of claim 17, wherein the transform order of the point cloud being determined according to Ks respectively corresponding to the three-dimensional coordinate components comprises:

determining the transform order of the point cloud to be zyx when Ks respectively corresponding to the three-dimensional coordinate components are K(X)<K(Y)<K(Z);

determining the transform order of the point cloud to be yzx when Ks respectively corresponding to the three-dimensional coordinate components are K(X)<K(Z)<K(Y);

determining the transform order of the point cloud to be zxy when Ks respectively corresponding to the three-dimensional coordinate components are K(Y)<K(X)<K(Z);

determining the transform order of the point cloud to be xzy when Ks respectively corresponding to the three-dimensional coordinate components are K(Y)<K(Z)<K(X);

determining the transform order of the point cloud to be yxz when Ks respectively corresponding to the three-dimensional coordinate components are K(Z)<K(X)<K(Y); and determining the transform order of the point cloud to be xyz when Ks respectively corresponding to the three-dimensional coordinate components are K(Z)<K(Y)<K(X).

19. The method of claim 13, wherein determining the transform order of the point cloud based on the information indicating the transform order of the point cloud comprises:

when the information indicating the transform order of the point cloud is a first value, the information indicating the transform order of the point cloud meets a first condition, determining the transform order of the point cloud is zyx;

when the information indicating the transform order of the point cloud is a second value, the information indicating the transform order of the point cloud meets a second condition, determining the transform order of the point cloud is yzx;

when the information indicating the transform order of the point cloud is a third value, the information indicating the transform order of the point cloud meets a third condition, determining the transform order of the point cloud is zxy;

when the information indicating the transform order of the point cloud is a fourth value, the information indicating the transform order of the point cloud meets a fourth condition, determining the transform order of the point cloud is xzy;

when the information indicating the transform order of the point cloud is a fifth value, the information indicating the transform order of the point cloud meets a fifth condition, determining the transform order of the point cloud is yxz;

when the information indicating the transform order of the point cloud is a sixth value, the information indicating the transform order of the point cloud meets a sixth condition, determining the transform order of the point cloud is xyz.

* * * * *